(12) United States Patent
Huston et al.

(10) Patent No.: US 8,371,626 B2
(45) Date of Patent: Feb. 12, 2013

(54) FUSELAGE DOOR SELF-LOCKING PIN LATCH

(75) Inventors: Joshua Ross Huston, Clearwater, KS (US); Justin Joseph Noland, Clearwater, KS (US)

(73) Assignee: Textron Innovations Inc., Providence, RI (US)

( * ) Notice: Subject to any disclaimer, the term of this patent is extended or adjusted under 35 U.S.C. 154(b) by 320 days.

(21) Appl. No.: 12/617,424

(22) Filed: Nov. 12, 2009

(65) Prior Publication Data

US 2011/0109103 A1 May 12, 2011

(51) Int. Cl.
*E05C 1/12* (2006.01)
(52) U.S. Cl. .......................... 292/164; 292/163; 292/139
(58) Field of Classification Search .................. 292/137, 292/163, 166–168, 138, 139, DIG. 31, DIG. 49
See application file for complete search history.

(56) References Cited

U.S. PATENT DOCUMENTS

| | | | | |
|---|---|---|---|---|
| 1,808,458 A | * | 6/1931 | Flynn | 292/167 |
| 1,818,366 A | * | 8/1931 | Vargo | 292/177 |
| 2,793,892 A | * | 5/1957 | Hutterer | 292/36 |
| 3,621,686 A | * | 11/1971 | Klein | 70/157 |
| 3,917,329 A | * | 11/1975 | Fujiki et al. | 292/163 |
| 4,072,332 A | * | 2/1978 | Isaia | 292/228 |
| 4,130,307 A | | 12/1978 | Poe et al. | |
| 4,312,204 A | * | 1/1982 | Davis | 70/472 |
| 4,421,349 A | | 12/1983 | Greiert, Jr. | |
| 4,518,179 A | * | 5/1985 | Fenner | 292/166 |
| 4,779,908 A | * | 10/1988 | Foshee et al. | 292/163 |
| 4,828,299 A | | 5/1989 | Poe | |
| 4,911,485 A | | 3/1990 | Wasilewski | |
| 5,064,147 A | | 11/1991 | Noble et al. | |
| 5,156,359 A | | 10/1992 | Noble et al. | |
| 7,431,354 B2 | * | 10/2008 | Raatikainen | 292/137 |
| 2004/0100104 A1 | * | 5/2004 | Magnusson | 292/163 |

\* cited by examiner

*Primary Examiner* — Carlos Lugo
*Assistant Examiner* — Mark Williams
(74) *Attorney, Agent, or Firm* — Lathrop & Gage LLP

(57) ABSTRACT

Latch systems for use in aircraft are disclosed. One system includes a frame, a pin at least partially inside frame, an interface portion, and a link. Pin has proximal and distal ends and is slidable between extended and retracted positions. Interface portion is pivotable between open and closed positions and has a handle for receiving a force to move interface portion to open and closed positions. Link is pivotably coupled to pin and interface portion such that pin is at extended position while interface portion is at closed position and pin is at retracted position while interface portion is at open position. Interface portion has an impact face in line with pin when interface portion is at closed position to ensure pin does not reach retracted position while interface portion is at closed position.

12 Claims, 4 Drawing Sheets

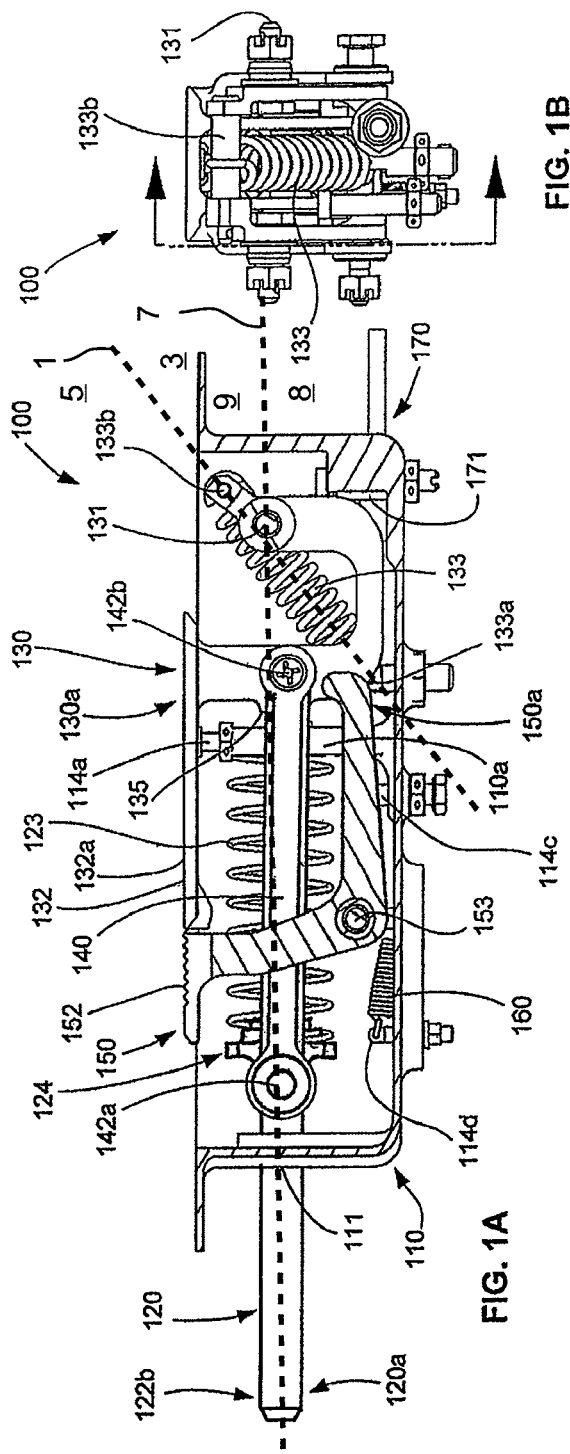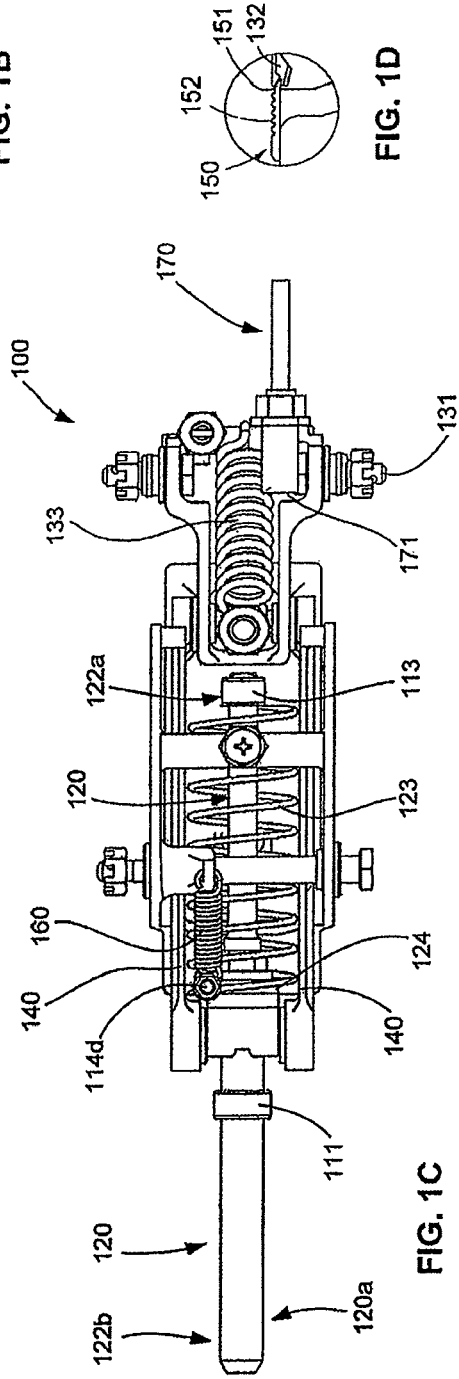

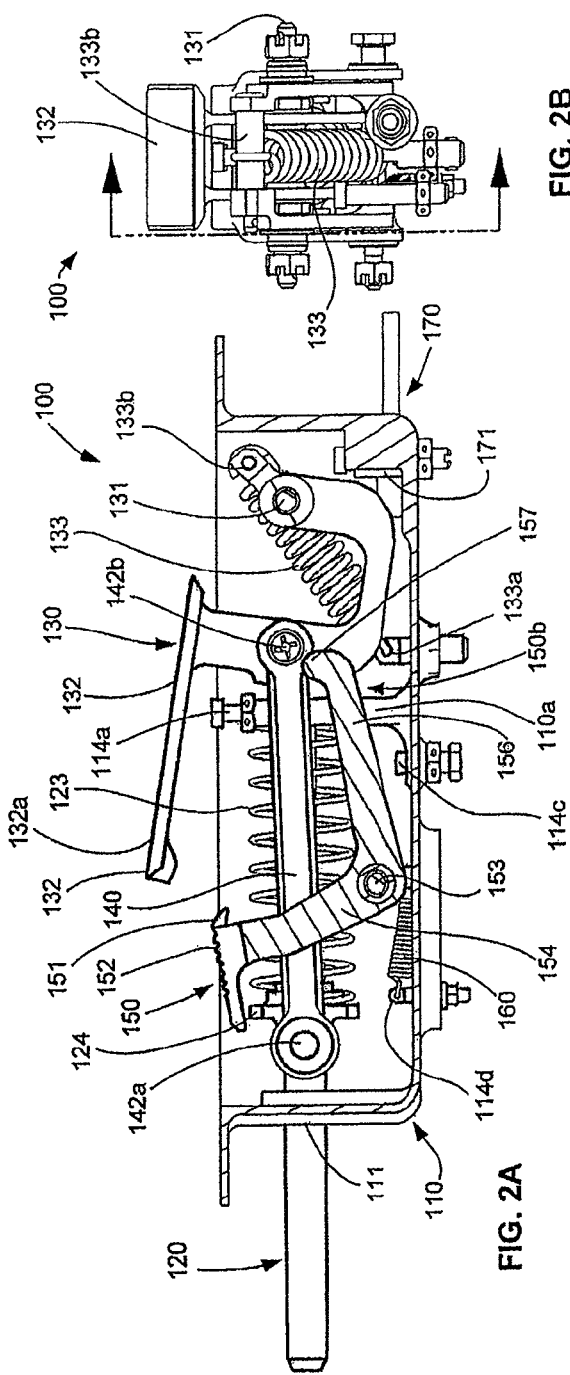
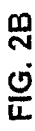
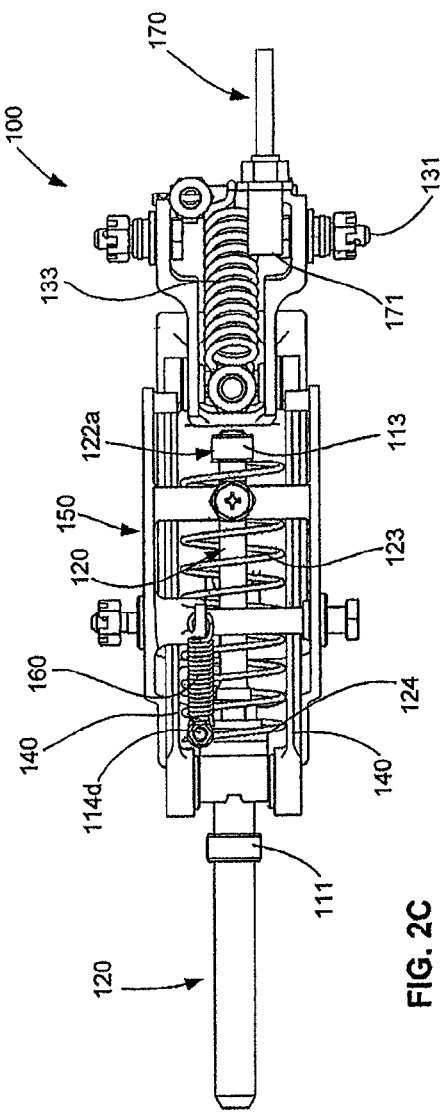
FIG. 2A
FIG. 2B
FIG. 2C

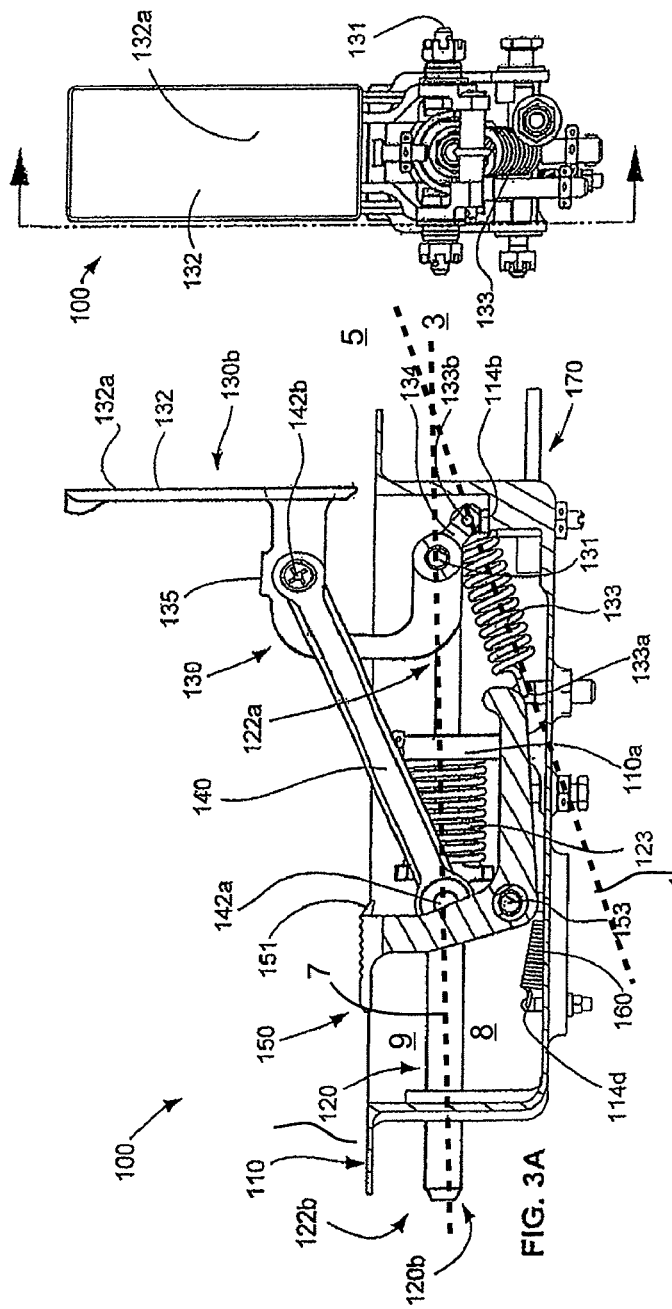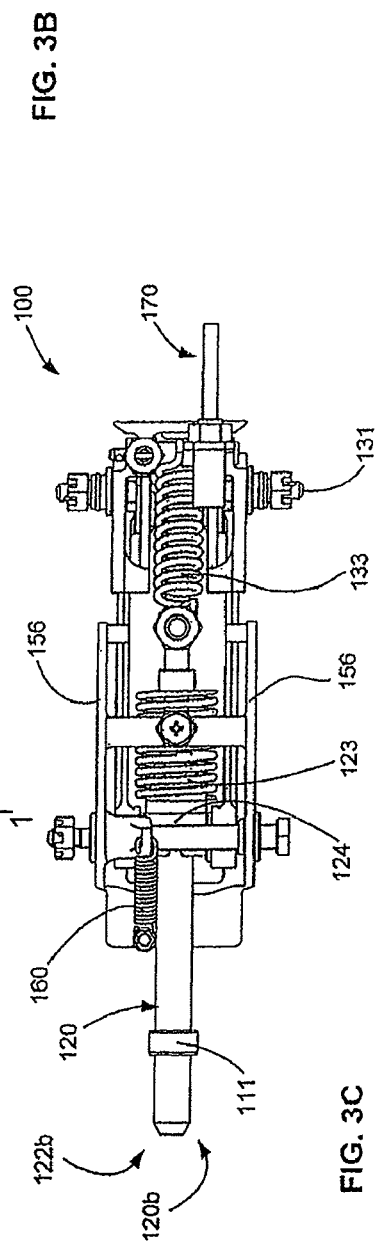
FIG. 3A
FIG. 3B
FIG. 3C

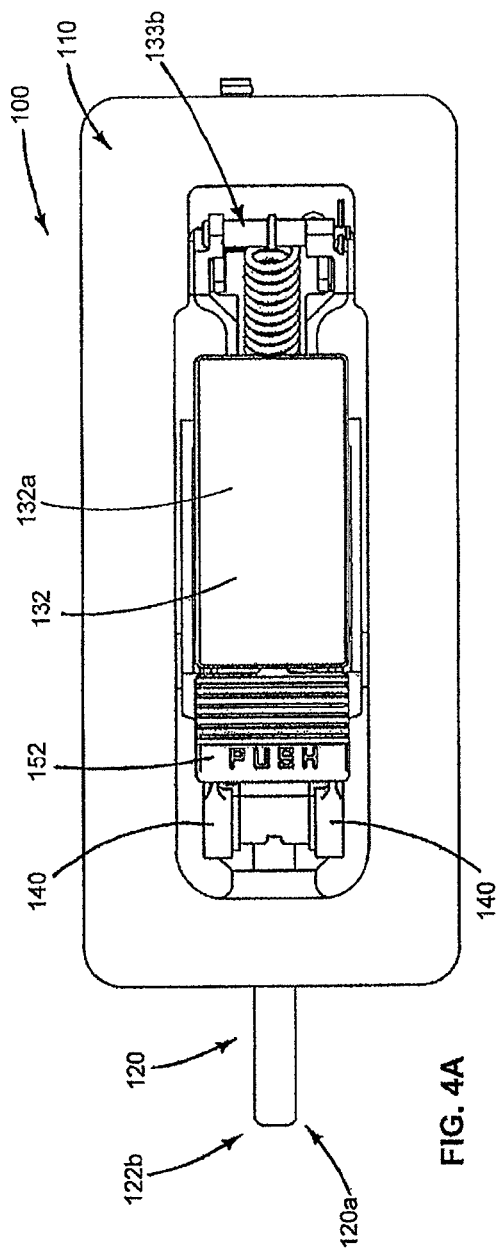
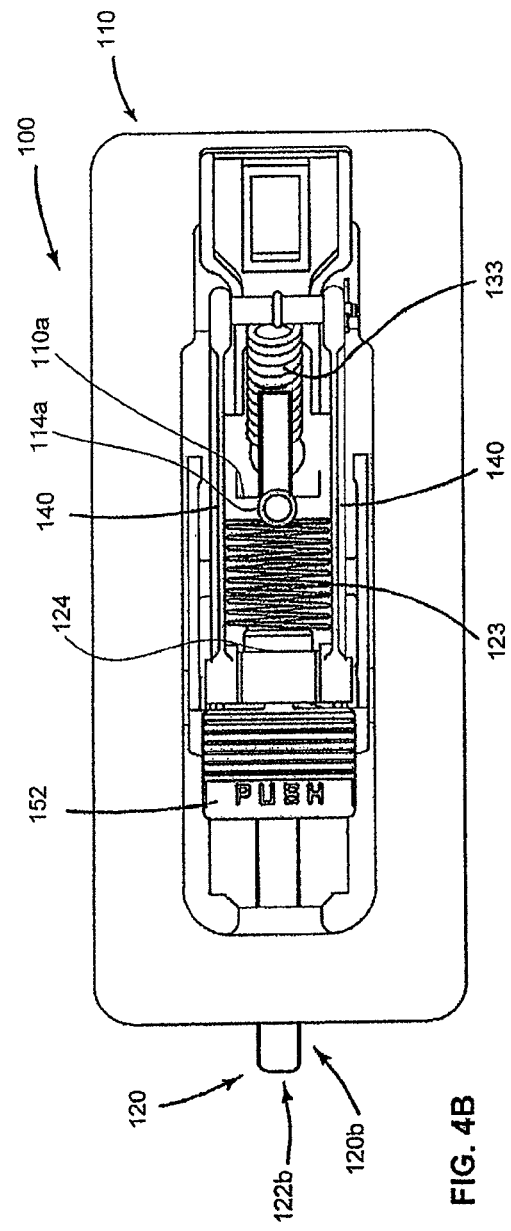
FIG. 4A
FIG. 4B

FUSELAGE DOOR SELF-LOCKING PIN LATCH

BACKGROUND OF THE INVENTION

The invention relates generally to the field of latches. More specifically, the invention relates to the field of aircraft door latches.

SUMMARY

The present invention is defined by the claims below. According to one embodiment, a latch system for use in aircraft includes a frame, a pin, an interface portion, and a link. The pin has proximal and distal ends and is slidable relative to the frame between extended and retracted positions. In addition, the pin is at least partially inside the frame when at the extended and retracted positions. The interface portion is pivotable relative to the frame between open and closed positions and has a handle for receiving a force from a user to move the interface portion to the open and closed positions. The link is pivotably coupled to the pin and the interface portion such that the pin is at the extended position while the interface portion is at the closed position and the pin is at the retracted position while the interface portion is at the open position. The interface portion has an impact face in line with the pin when the interface portion is at the closed position to ensure the pin does not reach the retracted position while the interface portion is at the closed position.

According to another embodiment, a latch system for use in aircraft includes a frame, a pin, an interface portion, a link, and a biasing member. The pin has proximal and distal ends and is slidable relative to the frame between extended and retracted positions. In addition, the pin is at least partially inside the frame when at the extended and retracted positions. The interface portion is pivotable relative to the frame (i.e., at an interface pivot point) between open and closed positions and has a handle for receiving a force from a user to move the interface portion to the open and closed positions. The link is pivotably coupled to the pin and the interface portion such that the pin is at the extended position while the interface portion is at the closed position and the pin is at the retracted position while the interface portion is at the open position. The biasing member is operatively coupled to the frame and the interface portion. Taking an imaginary straight line that extends from where the biasing member is operatively coupled to the frame to where the biasing member is operatively coupled to the interface portion, the imaginary straight line passes to one side of the interface pivot point when the interface portion is at the closed position (such that the biasing member biases the interface portion from leaving the closed position), and the imaginary straight line passes to another side of the interface pivot point when the interface portion is at the open position (such that the biasing member biases the interface portion from leaving the open position).

According to still another embodiment, a latch system for use in aircraft includes a frame, a pin, an interface portion, a link, and a trigger portion. The pin has proximal and distal ends and is slidable relative to the frame between extended and retracted positions. In addition, the pin is at least partially inside the frame when at the extended and retracted positions. The interface portion is pivotable relative to the frame between open and closed positions and has a handle for receiving a force from a user to move the interface portion to the open and closed positions. The link is pivotably coupled to the pin and the interface portion such that the pin is at the extended position while the interface portion is at the closed position and the pin is at the retracted position while the interface portion is at the open position. The trigger portion is pivotable relative to the frame between idle and striking positions, and the trigger portion has a handle for receiving a force from a user to move the trigger portion to the striking position. To reach the striking position, the trigger portion moves the interface portion from the closed position.

BRIEF DESCRIPTION OF THE SEVERAL VIEWS OF THE DRAWINGS

Illustrative embodiments of the present invention are described in detail below with reference to the attached drawings, wherein:

FIG. 1A is a side view of a latch system, taken as indicated from FIG. 1B, with a portion of housing shown, the latch system being at a first configuration;

FIG. 1B is a rear view of a latch system, with the housing omitted for clarity;

FIG. 1C is a bottom view of FIG. 1A, with the housing omitted for clarity;

FIG. 1D is a sectional view from FIG. 1A;

FIG. 2A is another side view of the latch system of FIG. 1A, but showing the latch system at a second configuration, taken as indicated from FIG. 2B, with a portion of the housing shown;

FIG. 2B is another rear view of the latch system of FIG. 1A, but showing the latch system at the second configuration, with the housing omitted for clarity;

FIG. 2C is another bottom view of the latch system of FIG. 1A, but showing the latch system at the second configuration, with the housing omitted for clarity;

FIG. 3A is still another side view of the latch system of FIG. 1A, but showing the latch system at a third configuration, taken as indicated from FIG. 3B, with a portion of the housing shown;

FIG. 3B is still another rear view of the latch system of FIG. 1A, but showing the latch system at the third configuration, with the housing omitted for clarity;

FIG. 3C is still another bottom view of the latch system of FIG. 1A, but showing the latch system at the third configuration;

FIG. 4A is a top view of the latch system FIG. 1A at the first configuration; and FIG. 4B is a top view of the latch system of FIG. 1A at the third configuration, with part of the interface portion omitted for clarity.

DETAILED DESCRIPTION

Embodiments of the present invention provide systems and methods for latching aircraft doors.

FIGS. 1A through 4B disclose a pin latch assembly 100. The assembly 100 includes a housing 110 (also referred to herein as a "frame") and a pin 120 with proximal and distal ends 122a, 122b. A guide sleeve 111 (FIG. 1C) defined in a forward end of the housing 110 receives the pin 120 and allows the pin 120 to only translate along a generally linear path between an extended position 120a (FIGS. 1A, 1C, and 4A) and a retracted position 120b (FIGS. 3A, 3C, and 4B). A bushing 113 incorporated at a more rearward position within the housing 110 may also restrict the pin 120 to axial movement and add support to the pin 120 on its axial path. Bushing 113 can be seen in FIGS. 1C and 2C. As shown throughout the accompanying figures, whether the pin 120 is at the extended position 120a or the retracted position 120b, at least a portion of the pin 120 is inside the frame 110.

When moved to the extended position 120a, the distal end 122b may be received into a corresponding aperture (i.e., "receiving area") which is defined by structure of the aircraft (not shown) adjacent the door and the pin latch assembly 100. A biasing member 123 (e.g., a spring, tensioned cord, etc.) bears against the pin 120, biasing it toward the extended position 120a (i.e., away from the retracted position 120b) such that the pin 120 may be maintained in the receiving area. As shown, a first end of compression spring 123 bears against a first side of spring boss 124, which is part of the pin 120, and a second end of spring 123 bears against a structural member of the frame 110 (e.g., member 110a, shown in FIG. 1A). In some embodiments, the spring 123 may be physically attached to the spring boss 124 and/or the frame 110, though this is clearly not required. Spring 123 is received around pin 120, as shown in FIG. 1C.

An interface portion 130 is pivotable relative to the frame 110 (i.e., at interface pivot point 131) between a closed position 130a (FIG. 1A) and an open position 130b (FIG. 3A). The interface portion 130 has a handle 132 for receiving a force from the user to move the interface portion 130 to the closed and open positions 130a, 130b. However, due to surrounding structure (e.g., the frame 110 and the trigger portion 150, discussed below), the handle 132 may only be accessible to move the interface portion 130 to the open position 130b when the interface portion 130 is not at the closed position 130a.

As shown in FIG. 1A and FIG. 3A, interaction between the interface portion 130 and the frame 110 may limit the rotation of the interface portion 130. For example, an adjustable element 114a (e.g., a bolt, lockable pin, etc.) of the frame 110 may restrict the interface portion 130 from traveling beyond the closed position 130a (e.g., such that an exterior surface 132a of the handle 132 remains flush with the frame 110 or the skin of the fuselage when the interface portion 130 is at the closed position 130a), and another adjustable element 114b (e.g., a bolt, lockable pin, etc.) of the frame 110 may restrict the interface portion 130 from traveling beyond the open position 130b (e.g., by bearing against arm 134 of the interface portion 130). By using adjustable elements 114a, 114b, the dimensions and tolerances of the interface portion 130 may be less critical, and adjustment of the adjustable elements 114a, 114b may change where the rotation of the interface portion 130 is limited.

A biasing member 133 (e.g., a spring, tensioned cord, etc.) is operatively coupled to the frame 110 and the interface portion 130, as shown in FIG. 1A and FIG. 3A. It may be preferable for the biasing member 133 to be configured such that the interface portion 130 is biased from leaving the closed position 130a (FIG. 1A) and also from leaving the open position 130b (FIG. 3A). For example, the location of the biasing member 133 may be such that an imaginary a straight line 1 extending from where the biasing member 133 is connected to the frame 110 (i.e., point 133a) to where the biasing member 133 is connected to the interface portion 130 (i.e., point 133b) passes to one side of the interface pivot point 131, i.e., the interface pivot point 131 is on a first side 3 of line 1, when the interface portion 130 is at the closed position 130a (see FIG. 1A), and passes to another side of the interface pivot point 131, i.e., the interface pivot point 131 is on a second side 5 of line 1, when the interface portion 130 is at the open position 130b (see FIG. 3A).

At least one link 140 is pivotably coupled to the pin 120 and the interface portion 130 (e.g., at pivot points 142a, 142b) such that the pin 120 is at the extended position 120a while the interface portion 130 is at the closed position 130a (FIG. 1A), and such that the pin 120 is at the retracted position 120b while the interface portion 130 is at the open position 130b (FIG. 3A). As shown in FIG. 1C, two links 140 may interact with the pin 120 and the interface portion 130 as set forth above. The two links 140 may be, for example, on opposite sides of the pin 120.

Returning to the interface portion 130 (FIG. 1A), the interface portion 130 may include an impact face 135 in line with the pin 120 when the interface portion 130 is at the closed position 130a to ensure that the pin 120 does not reach the retracted position 120b while the interface portion 130 is at the closed position 130a. For example, if the link(s) 140 were to fail, the pin 120 could only travel until reaching the impact face 135. As such, the distal end 122b of the pin 120 would be maintained in the receiving area. Further, to avoid any torque that would tend to ultimately move the pin 120 to the retracted position 120b, the pivot point 142b may be located below, i.e., on a first side 8 of, a straight line 7 extending between pivot points 131 and 142a when the interface portion 130 is at the closed position 130a (see FIG. 1A), and the pivot point 142b may be located above, i.e., on a second side 9 of, the straight line 7 when the interface portion 130 is at the open position 130b (see FIG. 3A). The pin 120, the link(s) 140, and the pivot points 142a, 142b may all be coplanar when the interface portion 130 is at the closed position 130a.

Turning now to FIGS. 1A, 1D, 2A, and 3A, the trigger portion 150 may serve at least one of two purposes. First, the trigger portion 150 may interact with the handle 132 to maintain the interface portion 130 at the closed position 130a until the user interacts with the trigger portion 150. More particularly, the handle 132 may include a catch 132b, and the trigger portion 150 may have a projection 151 configured to be received in the catch 132b (FIG. 1D). Placement of the projection 151 in the catch 132b (and, more particularly, the resulting interaction between the projection 151 and the handle 132) may bias the interface portion 130 from leaving the closed position 130a until the user interacts with the trigger portion 150.

Second, the trigger portion 150 may compel the handle 132 away from the closed position 130a such that the user may then move the interface portion 130 to the open position 130b. This may be important because, as noted above, the handle 132 may not be accessible when the interface portion 130 is at the closed position 130a. To accomplish the second function, the trigger portion 150 may be pivotable relative to the frame 110 (e.g., about pivot point 153) between an idle position 150a (FIG. 1A) and a striking position 150b (FIG. 2A), and may include a handle 152 for receiving a force from the user to move the trigger portion 150 to the striking position 150b. To reach the striking position 150b, the trigger portion 150 first interacts with the interface portion 130 and/or the link 140 to move the interface portion 130 from the closed position 130a. The trigger portion 150 in the embodiment shown throughout the drawings includes a pair of arms 154 that extend downwardly from the handle 152 to adjacent the pivot point 153 and a pair of generally parallel arms 156 that extend from adjacent the pivot point 153 and terminate in an upwardly extending impact portion 157 (FIG. 2A). The impact portions 157 may interact with the interface portion 130 and/or the link 140 to move the interface portion 130 from the closed position 130a (allowing the user to grab the handle 132) as the trigger portion 150 moves to the striking position 150b.

As shown in FIG. 1A, interaction between the trigger portion 150 and the frame 110 may limit the rotation of the trigger portion 150. For example, an adjustable element 114c (e.g., a bolt, lockable pin, etc.) of the frame 110 may restrict the trigger portion 150 from traveling beyond a desired point (e.g., such that an exterior surface 152a of the handle 152 extends flush with the frame 110 or the skin of the fuselage, as shown in FIG. 1A). Adjustment of the adjustable element 114c may change where the rotation of the trigger portion 150 is limited.

A biasing member 160 (e.g., a spring, tensioned cord, etc.) is operatively coupled to the frame 110 and the trigger portion 150, as shown in FIG. 1A, such that the trigger portion 150 is biased to the idle position 150a. The biasing member 160 may be coupled to the frame 110 in a manner that allows the biasing force provided by the biasing member 160 to be adjustable. For example, the biasing member 160 may be coupled to an adjustable element 114d (e.g., a bolt, lockable pin, etc.) of the frame 110.

A magnetic proximity switch 170 (FIG. 1A) may be included to recognize when the pin 120 is at the extended position 120a (e.g., when the interface portion 130 is at the closed position 130a). In the embodiment shown in the accompanying figures, the switch 170 includes a first end 171 with a magnetic sensing device which reads when the interface portion 130 is at the closed position 130a. When the interface portion 130 is close to the switch 170, a magnetically-triggered signal is transmitted to the electronic systems of the aircraft to indicate the state of the pin latch assembly 100. This can be important, as it serves to alert the crew if the pin latch assembly 100 is not used properly.

Considering the operation of the pin latch assembly 100 as a whole, attention is again directed to FIGS. 1A through 1D and FIG. 4A. While at this configuration, the pin 120 is at the extended position 120a (and the distal end 122b is preferably received in the receiving area of the adjacent aircraft structure), the interface portion 130 is at the closed position 130a, and the trigger portion 150 is at the idle position 150a. The biasing member 123 biases the pin 120 toward the extended position 120a, the biasing member 133 biases the interface portion 130 toward the closed position 130a, and the biasing member 160 biases the trigger portion 150 toward the idle position 150a. The interaction between the handle 132 and the projection 151 of the trigger portion 150 also biases the interface portion 130 from leaving the closed position 130a (as discussed in detail above). The proximity switch 170 reads that the interface portion 130 is at the closed position 130a and transmits a signal indicating that the pin 120 is at the extended position 120a.

While at this configuration, there are no forces or torques tending to move the pin 120 from the extended position 120a or move any other element of the pin latch assembly 100. Additionally, as noted above, if the link(s) 140 were to fail, the biasing member 123 and/or the impact face 135 would prevent the pin 120 from reaching the retracted position 120b. Simply put, the pin 120 will always be biased into the receiving area in the surrounding door structure while the interface portion 130 is at the closed position 130a and the trigger portion 150 is at the idle position 150a (i.e., until a user physically engages the pin latch assembly 100), as discussed below.

To unlock the pin latch assembly 100 (i.e., to move the pin 120 to the retracted position 120b), a user first imparts force on the trigger handle 152, causing the trigger portion 150 to rotate about the pivot point 153 to the striking position 150b (FIG. 2A). In moving to the striking position 150b, the trigger portion 150 first interacts with the interface portion 130 and/or the link 140 to move the interface portion 130 from the closed position 130a, as noted above. This may be important since the handle 132 is preferably not accessible when the interface portion 130 is at the closed position 130a. In addition, depressing the trigger handle 152 may cause the projection 151 to separate from the catch 132b.

It should be appreciated that the state of the system shown in FIG. 2A is not a natural state; it is temporarily created by the force imparted on the trigger handle 152. After this force is removed, the interface portion 130 and the trigger portion 150 will naturally go back to the positions shown in FIG. 1A. This return (from the state shown in FIG. 2A) to the original state shown in FIG. 1A is compelled by the biasing members 123, 133, 160. Thus, because (until the interface portion 130 is at the open position 130b) the system will return to the state shown in FIG. 1 when the force on the trigger handle 152 is removed, the interface portion handle 132 is only accessible so long as the trigger handle 152 is depressed.

While the interface portion 130 is moved from the closed position 130a, the user may grab the interface portion handle 132 and rotate the interface portion 130 about the interface pivot point 131 to the open position 130b (FIGS. 3A through 3C). And when the interface portion handle 132 has been grabbed by the user, the trigger portion 150 may be entirely released, allowing the biasing member 160 to return the trigger portion 150 to the idle position 150a. Once at the open position 130b, the biasing member 133 may bias the interface portion 130 from leaving the open position 130b, as described in more detail above. The rotation of the interface portion 130 to the open position 130b causes the link 140 to slide the pin 120 to the retracted position 120b. Though various configurations may function suitably, in a currently preferred embodiment, the pin 120, the interface portion 130, and the link 140 are collectively configured such that rotating the interface portion 130 about ninety degrees between the closed and open positions 130a, 130b causes the pin 120 to travel about one and a half inches.

To return the pin 120 to the extended configuration 120a, the interface portion handle 132 may be rotated about the interface pivot point 131 to the closed position 130a. To fully reach the closed position 130a, the trigger handle 152 may be slightly depressed to allow the projection 151 to enter the catch 132b. The rotation of the interface portion 130 to the closed position 130a causes the link 140 to slide the pin 120 to the extended position 120a. If there is a mechanical failure that prevents the pin 120 from moving to the extended position 120a, interaction between the various elements will prevent the interface portion 130 from reaching the closed position 130a.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A latch system for use in aircraft, said latch system comprising:
 a frame;
 a pin having proximal and distal ends and being slidable relative to the frame between extended and retracted positions, the pin being at least partially inside the frame when at the extended and retracted positions;

an interface portion being pivotable relative to the frame between open and closed positions, the interface portion having a handle for moving the interface portion to the open and closed positions;

a link pivotably coupled to the pin and the interface portion such that the pin is at the extended position while the interface portion is at the closed position and the pin is at the retracted position while the interface portion is at the open position; and a biasing member operatively coupled to the frame at a first coupling point and the interface portion at a second coupling point, the biasing member having a substantially straight longitudinal axis along which the biasing member can apply at least one of compressive and tensile force between the first and second coupling points; wherein:

the interface portion is pivotable relative to the frame at an interface pivot point, such that:

(i) the interface pivot point is located on a first side of a straight line between the first and second coupling points when the interface portion is at the closed position such that the biasing member biases the interface portion from leaving the closed position by tensile force applied by the biasing member along its substantially straight longitudinal axis, and (ii) the interface pivot point is located on a second side of the straight line between the first and second coupling points when the interface portion is at the open position such that the biasing member biases the interface portion from leaving the open position by tensile force applied by the biasing member along its substantially straight longitudinal axis.

2. The system of claim 1, further comprising a trigger portion being pivotable relative to the frame between idle and striking positions, the trigger portion having a handle for receiving a force from a user to move the trigger portion to the striking position, the trigger portion moving the interface portion from the closed position to reach the striking position.

3. The system of claim 2, wherein the interface portion handle is only accessible to move the interface portion to the open position when the interface portion is not at the closed position.

4. The system of claim 3, further comprising a second biasing member operatively coupled to the frame and the trigger portion, the second biasing member biasing the trigger portion to the idle position.

5. The system of claim 4, wherein:

the frame includes first, second, and third adjustable elements;

interaction between the interface portion and the first adjustable element limits the rotation of the interface portion in a first direction;

adjustment of the first adjustable element changes where the rotation of the interface portion in the first direction is limited;

interaction between the interface portion and the second adjustable element limits the rotation of the interface portion in a second direction;

adjustment of the second adjustable element changes where the rotation of the interface portion in the second direction is limited;

interaction between the trigger portion and the third adjustable element limits the rotation of the trigger portion in one direction; and adjustment of the third adjustable element changes where the rotation of the trigger portion in the one direction is limited.

6. The system of claim 5, further comprising a third biasing member operatively coupled to the frame and the pin, the third biasing member biasing the pin away from the retracted position.

7. The system of claim 6, wherein the first, second, and third biasing members are springs.

8. The system of claim 7, wherein the pin, the interface portion, and the link are collectively configured such that rotating the interface portion between the closed and open positions causes the pin to travel about one and a half inches; and wherein the interface portion rotates about ninety degrees between the closed and open positions.

9. The system of claim 4, wherein the second biasing member is operatively coupled to the frame such that a biasing force provided by the second biasing member is adjustable.

10. The system of claim 1, further comprising a second link pivotably coupled to the pin and the interface portion.

11. The system of claim 1, wherein:

the link is pivotably coupled to the pin at a first link pivot point;

the link is pivotably coupled to the interface portion at a second link pivot point; and the second link pivot point is on a first side of a second straight line between the first link pivot point and the interface pivot point when the interface portion is at the closed position, and the second link pivot point is on a second side of the second straight line between the first link pivot point and the interface pivot point when the interface portion is at the open position.

12. The system of claim 1, wherein the interface portion has an impact face in line with the pin when the interface portion is at the closed position to ensure the pin does not reach the retracted position while the interface portion is at the closed position.

* * * * *